United States Patent
Gao et al.

(10) Patent No.: US 9,836,958 B2
(45) Date of Patent: Dec. 5, 2017

(54) DEVICE CONTROL METHOD, SERVER, SYSTEM AND COMPUTER STORAGE MEDIUM

(71) Applicant: ZTE CORPORATION, Shenzhen, Guangdong Province (CN)

(72) Inventors: Jian Gao, Shenzhen (CN); Xuelun Yan, Shenzhen (CN)

(73) Assignee: XI'AN ZHONGXING NEW SOFTWARE CO., LTD., Xi'an, Shaanxi (CN)

( * ) Notice: Subject to any disclaimer, the term of this patent is extended or adjusted under 35 U.S.C. 154(b) by 0 days.

(21) Appl. No.: 15/100,340

(22) PCT Filed: Apr. 23, 2014

(86) PCT No.: PCT/CN2014/076025
§ 371 (c)(1),
(2) Date: May 31, 2016

(87) PCT Pub. No.: WO2014/187221
PCT Pub. Date: Nov. 27, 2014

(65) Prior Publication Data
US 2016/0300483 A1    Oct. 13, 2016

(30) Foreign Application Priority Data

Dec. 12, 2013  (CN) .......................... 2013 1 0681181

(51) Int. Cl.
*G08C 23/04* (2006.01)
*H04L 12/64* (2006.01)
(Continued)

(52) U.S. Cl.
CPC .......... *G08C 23/04* (2013.01); *H04L 12/6418* (2013.01); *H04L 12/66* (2013.01);
(Continued)

(58) Field of Classification Search
CPC . H04L 12/6418; H04L 12/66; H04L 12/2818; H04L 12/2836; H04L 67/125;
(Continued)

(56) References Cited

U.S. PATENT DOCUMENTS

| | | | |
|---|---|---|---|
| 8,482,450 B2* | 7/2013 | Choi | G08C 17/02 341/176 |
| 8,885,552 B2* | 11/2014 | Bedingfield, Sr. | H04L 12/2818 348/734 |

(Continued)

FOREIGN PATENT DOCUMENTS

| | | |
|---|---|---|
| CN | 101378341 A | 3/2009 |
| CN | 102420784 A | 4/2012 |

(Continued)

*Primary Examiner* — Ali Neyzari
(74) *Attorney, Agent, or Firm* — Ling Wu; Stephen Yang; Ling and Yang Intellectual Property

(57) ABSTRACT

A device control method, a server, a system and a computer storage medium are provided. The method includes: receiving account information, a device identifier and a device control instruction sent by a user terminal (S101); acquiring a universal infrared controller identifier corresponding to the device identifier, and infrared pulse parameters corresponding to the device control instruction (S102); sending the infrared pulse parameters to the universal infrared controller corresponding to the universal infrared controller identifier through a home gateway corresponding to the account information; wherein the infrared pulse parameters are provided for the universal infrared controller to generate an infrared pulse instruction used to control a device corresponding to the device identifier to execute a corresponding operation (S103).

20 Claims, 8 Drawing Sheets

(51) Int. Cl.
*H04N 21/422* (2011.01)
*H04L 12/66* (2006.01)
H04L 29/08 (2006.01)
H04W 4/00 (2009.01)

(52) U.S. Cl.
CPC ... *H04N 21/42204* (2013.01); *G08C 2201/92* (2013.01); *H04L 67/125* (2013.01); *H04W 4/008* (2013.01)

(58) Field of Classification Search
CPC ......... H04N 21/6418; H04N 21/42204; G08C 17/02; G08C 23/04; G08C 2201/92; H04W 4/008
USPC ...................................................... 340/12.25
See application file for complete search history.

(56) References Cited

U.S. PATENT DOCUMENTS

| | | | |
|---|---|---|---|
| 9,294,800 B2 * | 3/2016 | McMahon | G06F 21/445 |
| 2003/0038849 A1 | 2/2003 | Craven et al. | |
| 2011/0050478 A1 | 3/2011 | Choi et al. | |
| 2011/0142059 A1 | 6/2011 | Bedingfield, Sr. et al. | |
| 2011/0273625 A1 | 11/2011 | McMahon et al. | |

FOREIGN PATENT DOCUMENTS

| | | |
|---|---|---|
| CN | 103237058 A | 8/2013 |
| CN | 103379154 A | 10/2013 |
| WO | 2012089710 A1 | 7/2012 |

* cited by examiner

DEVICE CONTROL METHOD, SERVER, SYSTEM AND COMPUTER STORAGE MEDIUM

TECHNICAL FIELD

The present document relates to communication technologies, and more particularly, to a device control method, a server, a system and a computer storage medium.

BACKGROUND OF THE RELATED ART

With the development of mobile Internet technologies, remotely controlling devices in family living environments has become a reality, the control on most current devices (such as air conditioners, televisions, automatic window switch devices, etc.) is implemented through the near-field infrared remote control mechanism, and for this infrared remote control mechanism, because the way of increasing the infrared transmission power cannot be used to increase the transmission distance of the control signal, the remote control is limited by the effective transmission distance of the infrared control signal, and in order to achieve a remote control on a device over the greater distance, the user also needs to purchase a set of new devices to support the remote control, which greatly increases the cost of implementing the remote control.

SUMMARY

The embodiment of the present document provides a device control method, a server, a system, and a computer storage media to break through the limitation of effective transmission distance of an infrared control signal, to implement the remote control of a device, and reduce the cost of remotely controlling a device.

The embodiment of the present document provides a device control method, comprising:

receiving account information, a device identifier and a device control instruction sent by a user terminal;

acquiring a universal infrared controller identifier corresponding to the device identifier and infrared pulse parameters corresponding to the device control instruction;

sending the infrared pulse parameters to a universal infrared controller corresponding to the universal infrared controller identifier, through a home gateway corresponding to the account information, wherein the infrared pulse parameters are provided for the universal infrared controller to generate an infrared pulse instruction, and the infrared pulse instruction is used to control a device corresponding to the device identifier to execute a corresponding operation.

Preferably, said receiving account information, a device identifier and a device control instruction sent by a user terminal comprises:

receiving device control information sent by the user terminal;

parsing the device control information to acquire the account information, the device identifier, and the device control instruction.

Preferably, said receiving account information, a device identifier and a device control instruction sent by a user terminal comprises:

receiving the account information sent by the user terminal;

sending the device identifier and the device control instruction corresponding to the account information to the user terminal for the user terminal to determine a device identifier corresponding to a target device and the device control instruction that a target device needs to execute;

receiving the device identifier of the target device and the device control instruction sent by the user terminal.

Preferably, before receiving the account information, the device identifier, and the device control instruction sent by the user terminal, the method further comprises:

registering the home gateway, and storing a corresponding relationship between the account information and the home gateway;

receiving a universal infrared controller identifier, a device identifier and attribute information of the device that are bound with the home gateway and sent by the home gateway;

determining the device identifier and the attribute information of the device corresponding to the account information according to the corresponding relationship between the account information and the home gateway, and the device identifier and the attribute information of the device bound with the home gateway.

Preferably, before receiving the account information, the device identifier and the device control instruction sent by the user terminal, the method further comprises:

registering the device and storing the device control instruction of the device, and infrared pulse parameters corresponding to the device control instruction according to the attribute information of the device.

Preferably, said registering the device and storing the device control instruction of the device and the infrared pulse parameters corresponding to the device control instruction according to the attribute information of the device, comprises:

receiving the attribute information of the device and the device control instruction sent by the user terminal;

acquiring the infrared pulse parameters from the universal infrared controller through the home gateway, wherein the infrared pulse parameters are generated by the universal infrared controller according to a infrared pulse instruction corresponding to the device control instruction, and the infrared pulse instruction is acquired by the universal infrared controller from an infrared remote controller;

storing the attribute information of the device, the device control instruction and the infrared pulse parameters corresponding to the device control instruction.

Preferably, before receiving the attribute information of the device and the device control instruction sent by the user terminal, the method further comprises:

receiving a device control instruction user-defined request sent by the user terminal;

sending the stored device control instruction to the user terminal for the user terminal to determine a user-defined device control instruction according to the device control instruction and an operation of a user.

Preferably, the attribute information of the device comprises a type of the device, a manufacturer of the device, and a model of the device.

The embodiment of the present document further provides a server, comprising:

a first receiving module, configured to receive account information, a device identifier and a device control instruction sent by a user terminal;

a first acquiring module, configured to acquire a universal infrared controller identifier corresponding to the device identifier and infrared pulse parameters corresponding to the device control instruction;

a first sending module, configured to send the infrared pulse parameters to a universal infrared controller corresponding to the universal infrared controller identifier through a home gateway corresponding to the account information, wherein the infrared pulse parameters are provided for the universal infrared controller to generate an infrared pulse instruction, and the infrared pulse instruction is used to control a device corresponding to the device identifier to execute a corresponding operation.

Preferably, the first receiving module comprises:

a first receiving unit, configured to receive device control information sent by the user terminal;

a first parsing unit, configured to parse the device control information to acquire the account information, the device identifier, and the device control instruction.

Preferably, the first receiving module comprises:

a second receiving unit, configured to receive account information sent by the user terminal;

a first sending unit, configured to send the device identifier and the device control instruction corresponding to the account information to the user terminal for the user terminal to determine a device identifier corresponding to a target device and a device control instruction that the target device needs to execute;

a third receiving unit, configured to receive the device identifier of the target device and the device control instruction sent by the user terminal.

Preferably, the server further comprises:

a first registering module, configured to register the home gateway, and store a corresponding relationship between the account information and the home gateway;

a second receiving module, configured to receive a universal infrared controller identifier, a device identifier and attribute information of the device that are bound with the home gateway and sent by the home gateway.

Preferably, the server further comprises:

a second registering module, configured to register the device and store the device control instruction of the device and infrared pulse parameters corresponding to the device control instruction according to the attribute information of the device.

Preferably, the second registering module comprises:

a fourth receiving unit, configured to receive the attribute information of the device and the device control instruction sent by the user terminal;

a fifth receiving unit, configured to acquire infrared pulse parameters from the universal infrared controller through the home gateway, wherein the infrared pulse parameters acquired by the fifth receiving unit are generated by the universal infrared controller according to the infrared pulse instruction corresponding to the device control instruction;

a storing unit, configured to store the attribute information of the device, the device control instruction and the infrared pulse parameters corresponding to the device control instruction.

Preferably, the second registering module further comprises:

a sixth receiving unit, configured to receive a device control instruction user-defined request sent by the user terminal;

a second sending unit, configured to send the stored device control instruction to the user terminal for the user terminal to determine a user-defined device control instruction according to the device control instruction and an operation of a user.

The embodiment of the present document further provides a device control system, comprising: a server, a home gateway and a universal infrared controller; wherein, the server is configured to receive account information, a device identifier and a device control instruction sent by a user terminal; acquire a universal infrared controller identifier corresponding to the device identifier and infrared pulse parameters corresponding to the device control instruction; send the infrared pulse parameters to a universal infrared controller corresponding to the universal infrared controller identifier through the home gateway corresponding to the account information.

The home gateway is configured to receive the universal infrared controller identifier and the infrared pulse parameters sent by the server, and send the infrared pulse parameters to the universal infrared controller corresponding to the universal infrared controller identifier;

the universal infrared controller is configured to generate an infrared pulse instruction according to the infrared pulse parameters sent by the home gateway, and send the generated infrared pulse instruction to a device corresponding to the device identifier to make the device execute an operation.

Preferably, the server comprises: a first receiving module, a first acquiring module and a first sending module; a function of each module is the same as that described the above.

Preferably, the home gateway is further configured to bind the universal infrared controller identifier, the device identifier, and the attribute information of the device; send the universal infrared controller identifier, the device identifier and the attribute information of the device that are bound with the home gateway to the server.

Preferably, the home gateway is further configured to send the infrared pulse parameters acquired from the universal infrared controller to the server.

Preferably, the system further comprises:

an infrared remote controller, configured to send an infrared pulse instruction corresponding to the device control instruction to the universal infrared controller;

the universal infrared controller is further configured to generate infrared pulse parameters according to the received infrared pulse instruction and send the infrared pulse parameters to the home gateway.

The embodiment of the present document further provides a computer storage medium, wherein the computer storage medium stores computer-executable instructions, and the computer-executable instructions are used for executing the device control method.

In the technical scheme provided by the embodiment of the present document, because the home gateway is set between the user terminal and the device to be controlled, and the infrared pulse parameters of the user control device are sent to the universal infrared controller through the home gateway, the universal infrared controller generates an infrared control instruction according to the infrared pulse, and sends it to the device for the device executing the instruction; therefore, the user can control the device through the user terminal at any position, so that the distance between the user and the device breaks through the space limit of the effective transmission distance of the infrared control signal without purchasing new devices supporting the remote control, thus achieving the remote control on the basis of existing devices and greatly reducing the cost of remotely controlling the device.

SPECIFIED EMBODIMENTS

To make technical problems to be solved by the present document, technical schemes and advantages more clearly, hereinafter, the present document will be described in detail in conjunction with the accompanying drawings and specific embodiments.

Figure 1:
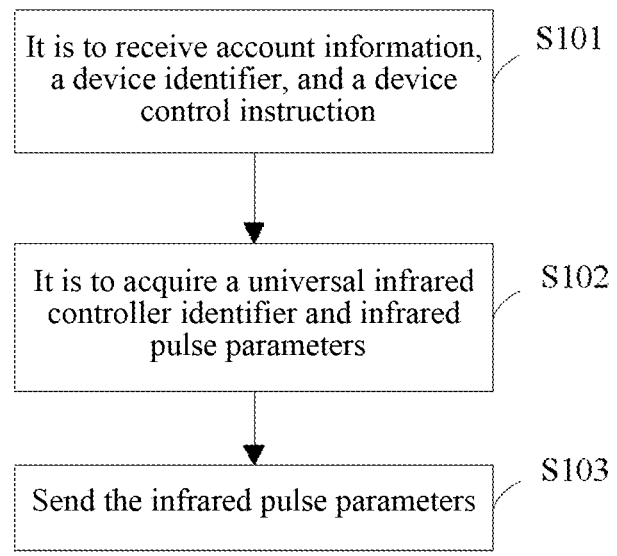
FIG. 1 is a flow chart of implementing a device control method in an embodiment of the present document.

The embodiment of the present document describes a device control method to support the remote control of a device, FIG. 1 is a flow chart of implementing the device control method in the embodiment of the present document, and as shown in FIG. 1, the following steps are included.

In step S101, it is to receive account information, a device identifier, and a device control instruction sent by a user terminal.

The main execution body of step S101 to step S103 is a server (also can be interpreted as an infrared remote control server), the server communicates with the user terminal to acquire the account information, the device identifier and the device control instruction indicated by the user through the client program running in the user terminal; the device identifier sent by the user terminal is used to uniquely characterize a device that the user desires to control, that is, the target device, the device control instruction sent by the user terminal is used to characterize operations that the user desires the target device to execute, such as powering on the device, powering off the device, etc.

The step S101 may also be: receiving the account information, the device identifier, and the device control instruction sent by the client; wherein, the client can run in the user terminal or the home gateway; that is, the user can send the account information, the device identifier and the device control instruction to the server through the user terminal to control the device, or send the account information, the device identifier and the device control instruction to the server through the home gateway to control the device.

In step S102, it is to acquire the universal infrared controller identifier corresponding to the device identifier and infrared pulse parameters corresponding to the device control instruction.

In step S103, it is to send the infrared pulse parameters to the universal infrared controller corresponding to the universal infrared controller identifier through the home gateway corresponding to the account information.

The universal infrared controller identifier is used to characterize the universal infrared controller, and the universal infrared controller supports sending an infrared pulse instruction corresponding to the infrared pulse parameters to the target device; the infrared pulse parameters are provided for the universal infrared controller to generate an infrared pulse instruction, wherein the infrared pulse instruction is used to control the device corresponding to the device identifier to make the device execute the corresponding operation, such as powering on the device, powering off the device;

In the present embodiment, regardless of where the user is, the server always supports receiving the account information, the device identifier and the device control instruction sent by the user through the user terminal (or client), and acquires the universal infrared control identifier corresponding to the device identifier, and the infrared pulse parameters corresponding to the device control instruction, sends the infrared pulse parameters through the home gateway to the universal infrared controller corresponding to the universal infrared controller identifier, for the infrared controller to generate an infrared pulse instruction according to the infrared pulse parameters, so as to control the device to execute the corresponding operation; herein, because the infrared pulse parameters can be transmitted in the network through the home gateway, it overcomes the limitation of transmission distance of the infrared pulse instruction (i.e., infrared control signal) in the infrared control mechanism in the related art, and realizes the remote control for the device, thus there is no need to purchase new devices to support the remote control, which reduces the cost of remotely controlling the device.

As an embodiment, said receiving the account information, the device identifier and the device control instruction sent by the user terminal comprises: receiving the device control information sent by the user terminal; parsing the device control information to acquire the account information, the device identifier and the device control instruction; the parsed-out device identifier is the identifier of the device that the user desires to control remotely (that is, the target device), and the parsed-out control instruction is the instruction that the user desires the target device to execute;

For example, the user can use a mobile phone to send a short message, wherein the short message comprises the account information, the device identifier and the device control instruction, after the server receives the short message, it parses the short message to acquire the account information, the device identifier, and the device control instruction.

When there are many devices that should be controlled remotely, if the user sends the device control information through the user terminal, the user needs to remember device identifiers and device control instructions of all the devices, which is not conducive for the user to use.

To solve the abovementioned problem, as one embodiment, said receiving the account information, the device identifier and the device control instruction sent by the user terminal comprises: receiving the account information sent by the user terminal; sending the device identifier and the device control instruction corresponding to the account information to the user terminal for the user to select the device identifier corresponding to the target device, and the device control instruction that the target device needs to execute, and receiving the device identifier and the device control instruction sent by the user terminal; wherein, the device identifier received by the server is the device identifier of the target device determined by the user terminal according to the operation of the user, the device control instruction received by the server is an instruction which is determined by the user terminal according to the operation of the user and is needed to be executed by the target device; the user terminal in the present embodiment may also be a client, the client can run in a user terminal or home gateway, that is, the user can send account information to the server through the user terminal or the home gateway.

In the present embodiment, after the server receives the account information sent by the user through the user terminal (or the client), the server sends the device identifier and the device control instruction corresponding to the account information to the user terminal (or the client) for the user to select the device identifier corresponding to the target device, and the device control instruction that the target device needs to execute; and receives the device identifier and the device control instruction sent by the user terminal (or the client). Thus, the user does not need to remember numerous device identifiers and device control instructions and other information, which enhance the user experience during the device remote control implementation process.

The corresponding relationship between the account information and the device identifier may be pre-stored, but when there are new users needing to remotely control the device, it needs to generate a corresponding relationship between the new user account information and the device, and as an embodiment, before receiving the account information, the device identifier and the device control instruction, it may further comprise: registering the home gateway, storing the corresponding relationship between the account information and the home gateway; according to the stored corresponding relationship and the universal infrared controller identifier, the device identifier, and the attribute information of the device that are bound with the home gateway and acquired from the home gateway, determining the corresponding relationship between the user account information and the device identifier and the corresponding relationship between the user account information and the attribute information of the device;

In practical applications, the home gateway sends a registration request to the server to register, wherein the registration request carries the account information, so that the server stores the corresponding relationship between the home gateway and the account information;

In the present embodiment, when the user remotely controls the device for the first time, it is required to create a corresponding relationship between the user account information and the device, so after receiving the account information sent by the user through the user terminal (may also be sent by the client as described above), it is required to register the home gateway, create a corresponding relationship between the account information and the home gateway, and it can create the corresponding relationship between the account information and the device identifier and the corresponding relationship between the user account information and the attribute information of the device through the universal infrared controller identifier, the device identifier, and the attribute information of the device that are bound with the home gateway and acquired from the home gateway; therefore, the server can send the device identifier corresponding to the user account information to the user terminal (or the client described above) according to the account information sent by the user terminal, determine the device control instruction corresponding to the account information according the attribute information of the device corresponding to the account information, and send the device identifier and the device control instruction corresponding to the account information to the user terminal for the user to select.

As an embodiment, the server stores the corresponding relationship between the device control instruction and the infrared pulse parameters according to the attribute information of the device, in this corresponding relationship, it may lack the device control instruction and the infrared pulse parameters corresponding to the attribute information of a certain device, therefore, the server needs to register the device, accordingly, before receiving the account information, the device identifier and the device control instruction sent by the user terminal, it might further comprise: registering the device, storing the device control instruction of the device according to the attribute information of the device and the infrared pulse parameters corresponding to the device control instruction; that is to say, storing the attribute information of the device, the device control instruction, and the corresponding relationship of the device control instruction and the infrared pulse parameters.

In the present embodiment, when the device control instruction corresponding to a certain device does not exist, it might store the device control instruction and the corresponding infrared pulse parameters according to the attribute information of the device, and determine the device control instruction corresponding to the device to implement the remote control of the device.

As an embodiment, registering the device and storing the device control instruction of the device and the infrared pulse parameters corresponding to the device control instruction according to the attribute information of the device can be achieved through the following way: receiving the attribute information of the device and the device control instruction sent by the user terminal; acquiring the infrared pulse parameters from the infrared controller through the home gateway, wherein the acquired infrared pulse parameters are generated by the universal infrared controller according to the infrared pulse instruction corresponding to the device control instruction, and the infrared pulse instruction is acquired by the universal infrared controller from the infrared remote controller; storing the attribute information of the device, the device control instruction and the infrared pulse parameters corresponding to the device control instruction.

In the present embodiment, it might determine the device control instruction of the device according to the acquired corresponding relationship. The infrared pulse parameters may be acquired through the infrared remote controller matching with the device and provided by the device manufacturer, it may also be acquired through other ways, for example, the relevant infrared pulse parameters can be directly acquired from the device manufacturer.

Since the control instructions of different devices are similar, for example, most of the devices have power-on and power-off device control instructions, if all the user-defined device control instructions are defined entirely by the user, it will cause that operations of the user-defined device control instruction are too complicated.

As an embodiment, before receiving the attribute information of the device as well as the device control instruction sent the user terminal, it may further comprise: receiving the device control instruction user-defined request sent by the user terminal (which can also be sent via the abovementioned client); sending the stored device control instruction to the user terminal for the user terminal (or the abovementioned client) to determine the user-defined device control instruction according to the received device control instruction and the operation of the user.

In the present embodiment, upon receiving a message of requiring for defining the device control instruction, the pre-stored device control instruction can be sent to the user terminal (or the abovementioned client), the user can define the device control instruction required by the user on the basis of the received device control instruction, so as to complete the operation of defining the device control instruction by multiplexing the pre-stored device control instruction or by making simple modifications on the basis of the pre-stored device control instruction. Thus, it avoids the problem that the operation is too complicated because all the device control instructions are required completely to be defined by the user.

In practical applications, due to differences in the manufacturers and models of the devices, when the same device control instruction, such as the power-on device control instruction, is used for controlling different devices, the corresponding infrared pulse parameters are often different; it is required to determine the corresponding infrared pulse parameters according to the device manufacturers and models; accordingly, as an embodiment, the attribute information of a device is used to describe the device, and the attribute information of the device comprises the type of the device, the manufacturer of the device and the model of the device; thus, it may acquire device control instructions supported by a device and infrared pulse parameters corresponding to the device control instructions supported by the device according to the type of the device, the manufacturer of the device and the model of the device.

For example, when storing the infrared pulse parameters corresponding to the device control instructions, first, it may categorize the devices according to types of the devices, and categorize air conditioners into the category A, televisions into category B, infrared automatic switch window devices into the category C; then categorize the same type of devices according to device manufacturers. Taking air conditioners for example, Gree air conditioners provided by the Gree manufacturer are categorized into the category A.1, Media air conditioners provided by the Media manufacturer are categorized into the category A.2; finally, the same type of devices of the same brand is stored and categorized according to the models of the devices, taking the Gree air conditioners for example, device control instructions of the Gree air conditioner model T1 are categorized into the category A.1.1, device control instructions of the Gree air conditioner model T2 are categorized into the category A.1.2.

The embodiment of the present document further describes one computer-storage medium, wherein the computer storage medium stores computer-executable instructions, and the computer-executable instructions are used for executing the device control method shown in FIG. 1.

Figure 2:
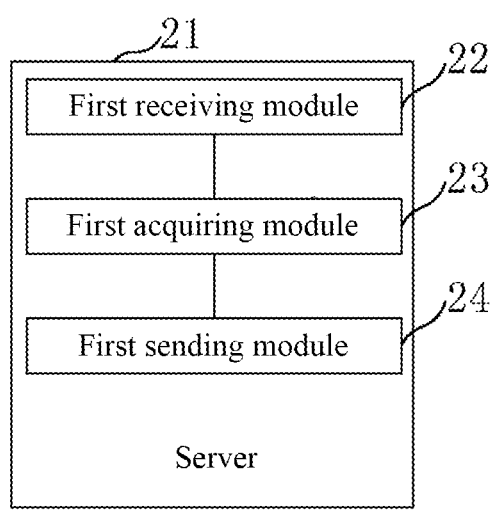
FIG. 2 is a schematic diagram of the structure of a server in an embodiment of the present document.

The embodiment of the present document further describes a server, and FIG. 2 is a schematic diagram of the structure of the server in an embodiment of the present document. As shown in FIG. 2, the server 21 comprises:

a first receiving module 22, configured to receive account information, a device identifier and a device control instruction sent by a user terminal;

a first acquiring module 23, configured to acquire a universal infrared controller identifier corresponding to the device identifier and infrared pulse parameters corresponding to the device control instruction;

a first sending module 24, configured to send the infrared pulse parameters to a universal infrared controller corresponding to the universal infrared controller identifier through a home gateway corresponding to the account information, wherein the infrared pulse parameters are provided for the universal infrared controller to generate an infrared pulse instruction, and the infrared pulse instruction is used to control a device corresponding to the device identifier to execute a corresponding operation.

In the abovementioned technical scheme, after the first receiving module 22 receives the account information, the device identifier and the device control instruction sent by the user terminal, the first acquiring module 23 acquires the universal infrared controller identifier corresponding to the device identifier and the infrared pulse parameters corresponding to the device control instruction, the first sending module 24 sends the infrared pulse parameters to the corresponding universal infrared controller through the home gateway according to the universal infrared controller identifier, and the universal infrared controller generates an infrared pulse instruction and controls the device to execute a corresponding operation according to the infrared pulse parameters, since the user can control the device through the user terminal at any position, the distance between the user and the device breaks through the space limit of the effective transmission distance of the infrared control signal, thus enabling the remote control of the device without purchasing devices and reducing the cost of remotely controlling the device.

As an embodiment, the first receiving module 22 may comprise: a first receiving unit and a first parsing unit (not shown in FIG. 2); wherein, the first receiving unit is configured to receive device control information sent by the user terminal;

the first parsing unit is configured to parse the device control information to acquire the account information, the device identifier, and the device control instruction.

As an embodiment, the first receiving module 22 may comprise: a second receiving unit, a first sending unit and a third receiving unit (not shown in FIG. 2); wherein, the second receiving unit is configured to receive the account information sent by the user terminal;

the first sending unit is configured to send the device identifier and the device control instruction corresponding to the account information to the user terminal for the user terminal to determine the device identifier corresponding to the target device, and the device control instruction that the target device needs to execute;

the third receiving unit is configured to receive the device identifier of the target device and the device control instruction sent by the user terminal.

As an embodiment, the server 21 may further comprise: a first registering module and a second receiving module (not shown in FIG. 2); wherein, the first registering module is configured to register a home gateway, and store a corresponding relationship between the account information and the home gateway;

the second receiving module is configured to receive the universal infrared controller identifier, the device identifier and attribute information of the device that are bound with the home gateway and sent by the home gateway.

As an embodiment, the server 21 may further comprise: a second registering module, configured to register the device, and store the device control instruction of the device and the infrared pulse parameters corresponding to the device control instruction according to the attribute information of the device.

As an embodiment, the second registering module may comprise: a fourth receiving unit, a fifth receiving unit and a storing unit (not shown in FIG. 2); wherein, the fourth receiving unit is configured to receive the attribute information of the device and the device control instruction sent by the user terminal;

the fifth receiving unit is configured to acquire the infrared pulse parameters from the universal infrared controller through the home gateway, wherein the acquired infrared pulse parameters are generated by the universal infrared controller according to the infrared pulse instruction corresponding to the device control instruction;

the storing unit is configured to store the attribute information of the device, the device control instruction, and the infrared pulse parameters corresponding to the device control instruction.

As an embodiment, the second registering module may further comprise: a sixth receiving unit and a second sending unit (not shown in FIG. 2); wherein, the sixth receiving unit is configured to receive a device control instruction user-defined request sent by the user terminal;

the second sending unit is configured to send the stored device control instruction to the user terminal for the user terminal to determine a user-defined device control instruction according to the device control instruction and the operation of the user.

In practical application, modules or units used for sending and receiving in the server 21, such as the second sending unit and the fourth receiving unit, can be implemented by chips supporting controlling the Transmission Control Protocol/Internet Protocol (TCP/IP) stack in the server 21; the storing unit in the server 21 may be implemented by the nonvolatile storage medium in the server 21; the first acquiring module 23, the first parsing unit, the first registering module and the second registering module in the server 21 can be implemented by the Central Processing Unit (CPU), the digital signal processor (DSP) or the Field Programmable Gate Array (FPGA) in the server 21.

Figure 3:
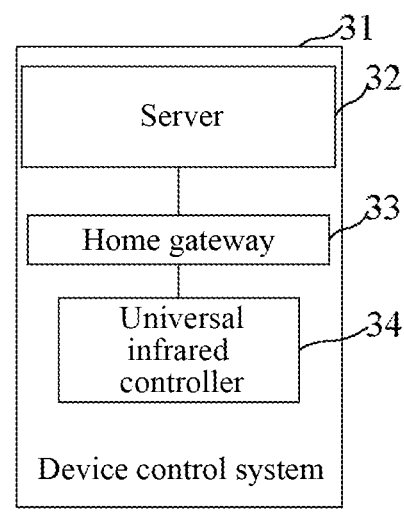
FIG. 3 is a schematic diagram of the structure of a device control system in an embodiment of the present document.

The embodiment of the present document further describes a device control system, and FIG. 3 is a schematic diagram of the structure of the device control system described in the embodiment of the present document, as shown in FIG. 3, the device control system 31 comprises: a server 32, a home gateway 33 and a universal infrared controller 34; wherein, the server 32 is configured to receive account information, a device identifier and a device control instruction sent by a user terminal; acquire the universal infrared controller 34 identifier corresponding to the device identifier, as well as the infrared pulse parameters corresponding to the device control instruction; send the infrared pulse parameters to universal infrared controller 34 corresponding to the universal infrared controller 34 identifier through the home gateway 33 corresponding to the account information.

The home gateway 33 is configured to receive the universal infrared controller 34 identifier as well as the infrared pulse parameters sent by the server 32, and send the infrared pulse parameters to the universal infrared controller 34 corresponding to the universal infrared controller 34 identifier;

the universal infrared controller 34 is configured to generate an infrared pulse instruction according to the infrared pulse parameters sent by the home gateway, send the generated infrared pulse instruction to the device corresponding to the device identifier, and make the device to execute operations.

As an embodiment, the server 32 is further configured to receive the device control information sent by the user terminal;

parse the device control information to acquire the account information, the device identifier, and the device control instruction.

As an embodiment, the server 32 is further configured to receive the account information sent by the user terminal;

send the device identifier and the device control instruction corresponding to the account information to the user terminal for the user terminal to determine the device identifier corresponding to the target device and the device control instruction that the target device needs to execute;

receive the device identifier of the target device and the device control instruction sent by the user terminal.

As an embodiment, the server 32 is further configured to register the home gateway, and store the corresponding relationship between the account information and the home gateway;

receive the universal infrared controller identifier, the device identifier, and the attribute information of the device that are bound with the home gateway and sent by the home gateway;

determine the device identifier and the attribute information of the device corresponding to the account information according to the corresponding relationship between the account information and the home gateway and the device identifier and the attribute information of the device that are bound with the home gateway.

As an embodiment, the server 32 is further configured to, before receiving the account information, the device identifier and the device control instruction sent by the user terminal, register the device, and store the device control instruction of the device and the infrared pulse parameters corresponding to the device control instruction according to the attribute information of the device.

As an embodiment, the server 32 is further configured to receive the attribute information of the device and the device control instruction sent by the user terminal;

acquire the infrared pulse parameters from the universal infrared controller through the home gateway, wherein the infrared pulse parameters are generated by the universal infrared controller according to the infrared pulse instruction corresponding to the device control instruction, and the infrared pulse instruction is acquired by the universal infrared controller from the infrared remote controller;

store the attribute information of the device, the device control instruction, and the infrared pulse parameters corresponding to the device control instruction.

As an embodiment, the server 32 is further configured to, before receiving the attribute information of the device as well as the device control instruction sent by the user terminal, receive a device control instruction user-defined request sent by the user terminal;

send the stored device control instruction to the user terminal for the user terminal to determine the user-defined device control instruction according to the device control instruction and the operation of the user.

As an embodiment, the attribute information of the device comprises the type of the device, the manufacturer of the device and the model of the device.

As an embodiment, the home gateway 33 is further configured to bind with the universal infrared controller 34 identifier, the device identifier, and the attribute information of the device; send the universal infrared controller 34 identifier, the device identifier, and the attribute information of the device that are bound with the home gateway 33 to the server 32.

As an embodiment, the home gateway 33 is further configured to send the infrared pulse parameters acquired from the universal infrared controller 34 to the server 32.

The server 32 and the home gateway 33 can establish a communication connection through the client/server (C/S)

architecture mode, the HyperText Transfer Protocol (HTTP) mode, or the General Packet Radio Service (GPRS) mode, and perform message interaction based on a private protocol made by the server 32 and the home gateway 33.

The universal infrared controller 34 can set up a private two-way communication protocol in the application layer on the basis of the Transmission Control Protocol/Internet Protocol (TCP/IP), and communicate with the home gateway 33.

As an embodiment, the device control system 31 further comprises: an infrared remote controller (not shown in FIG. 4), which is configured to send the infrared pulse instruction corresponding to the device control instruction to the universal infrared controller 34;

the universal infrared controller 34 is further configured to generate infrared pulse parameters according to the received infrared pulses instruction and send them to the home gateway 33.

The home gateway 33 may use the 433 MHZ band to send the infrared pulse parameters to the universal infrared controller 34; the universal infrared controller 34 may use the 38 KHZ band to send the infrared pulse instruction to the target device.

Figure 4:
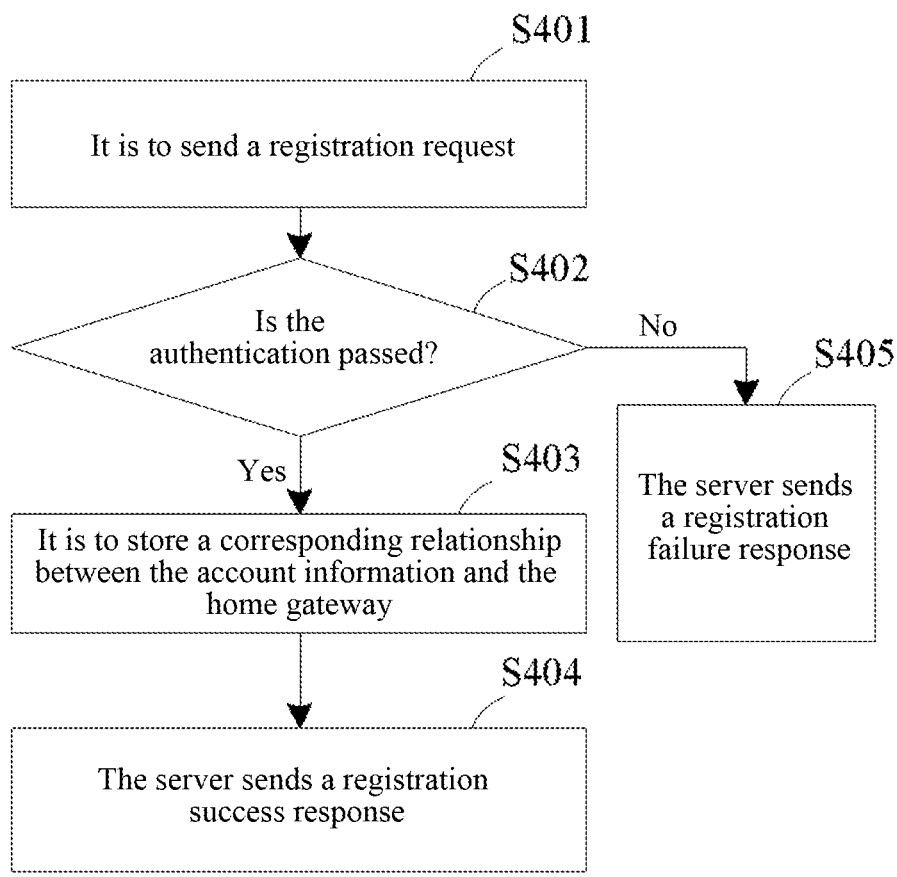
FIG. 4 is a flow chart of registering a home gateway in an embodiment of the present document.

FIG. 4 is a flow chart of the server registering the home gateway in an embodiment of the present document, and as shown in FIG. 4, which comprises the following steps.

In step S401, the server receives a registration request sent by the home gateway.

When a new user needs to remotely control the device, it is required to initiate a registration to the home gateway, and send the account information of the new user to the home gateway, the home gateway sends a registration request to the server, wherein the registration request sent by the home gateway carries account information of the new user.

In step S402, it is to judge whether the authentication of the home gateway is passed; if the authentication is passed, the process proceeds to step S403; otherwise, it proceeds to step S405.

The server receives the registration request from the home gateway, and authenticates the home gateway according to the account information carried in the registration request.

In step S403, it is to store the corresponding relationship between the account information and the home gateway.

In step S403, it may also determine the corresponding relationship between the account information of the new user and the device identifier and the corresponding relationship between the account information of the new user and the attribute information of the device according to the stored corresponding relationship, as well as the universal infrared controller identifier, the device identifier, and the attribute information of the device that are bound with the home gateway and acquired from the home gateway.

In step S404, the server sends a registration success response to the home gateway.

In step S405, the server sends a registration failure response to the home gateway.

Figure 5:
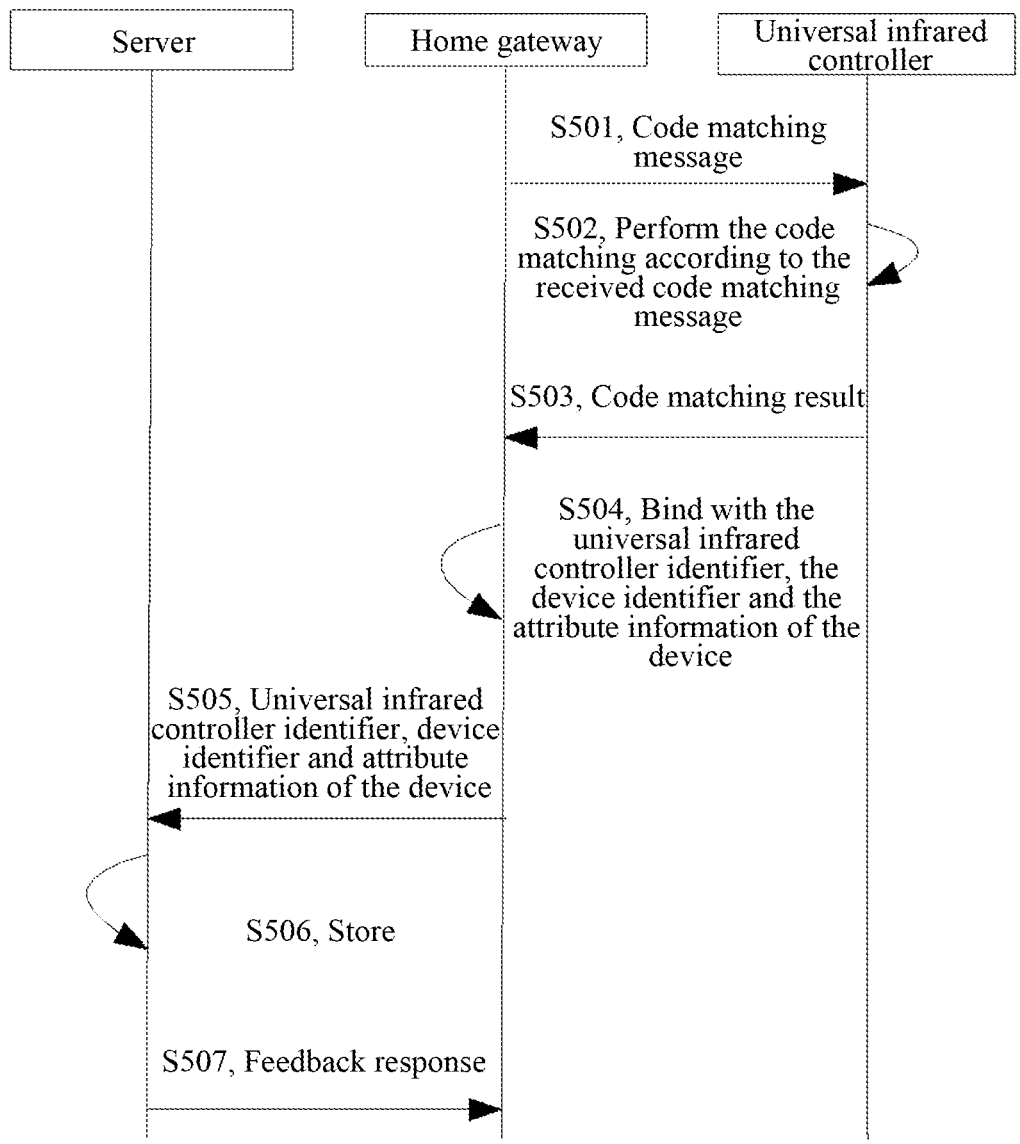
FIG. 5 is a flow chart of binding the home gateway and a universal infrared controller in the present document.

FIG. 5 is a flow chart of the home gateway binding with the universal infrared controller in the embodiment of the present document, and as shown in FIG. 5, which comprises the following steps.

In step S501, the home gateway sends a code matching message to the universal infrared controller.

The home gateway sends the code matching message to the universal infrared controller corresponding to the infrared controller identifier according to the infrared controller identifier sent by the user via the user terminal.

In step S502, after receiving the code matching message sent by the home gateway, the universal infrared controller executes the code matching.

In this step, the universal infrared controller performs the code matching according to the received code matching message to judge whether the home gateway sending the code matching message is the home gateway pre-associated with the universal infrared controller.

In step S503, the universal infrared controller sends the code matching result to the home gateway.

If the code matching is not successful, this binding process may be terminated; if the code matching is successful, it is to carry the device identifier of the device controlled by the universal infrared controller and the attribute information of the device controlled by the universal infrared controller in the code matching feedback information.

In step S504, the home gateway binds the universal infrared controller identifier, the identifier of the device and the attribute information of the device.

That is, the home gateway establishes a corresponding relationship of the home gateway itself and the universal infrared controller identifier, the device identifier, and the attribute information of the device.

In step S505, the home gateway sends the universal infrared controller identifier, the device identifier and the attribute information of the device to the server.

In step S506, the server stores the universal infrared controller identifier, the device identifier and the attribute information of the device.

That is, the server stores the corresponding relationship between the home gateway and the universal infrared controller identifier, the device identifier and the attribute information of the device.

In step S507, the server sends the feedback information to the home gateway.

The feedback information is used to confirm that the home gateway and the universal infrared controller are bound, that is, storing the corresponding relationship between the home gateway and the universal infrared controller identifier, the device identifier and the attribute information of the device.

Figure 6:
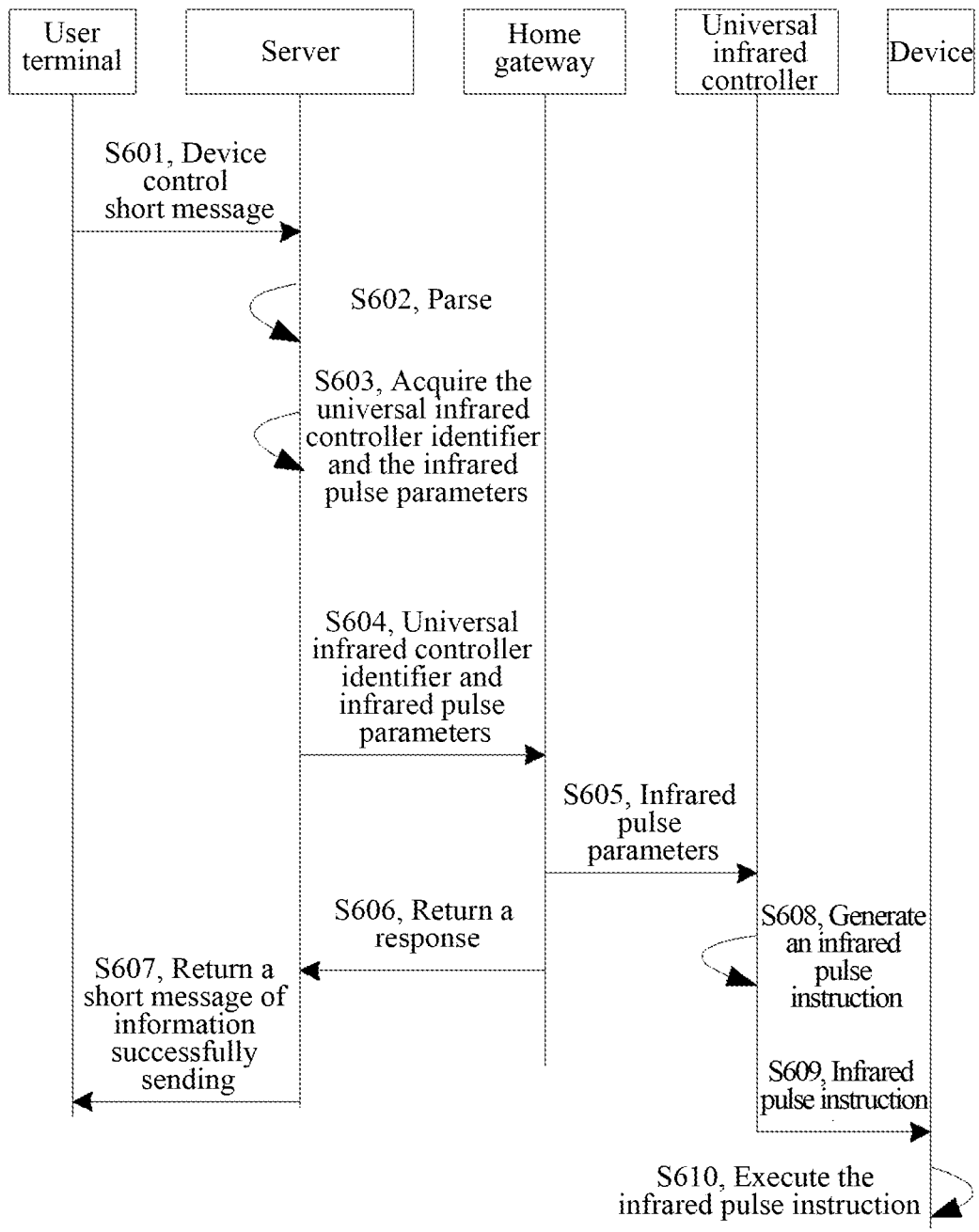
FIG. 6 is a first flow chart of implementing a remote control for a device in an embodiment of the present document.

In the following, the user sending short messages through a mobile phone to remotely controlling the device is taken as an example to illustrate the technical scheme described in the embodiment of the present document, FIG. 6 is the first flow chart of implementing the device control in the embodiment the present document, and as shown in FIG. 6, which comprises the following steps.

In step S601, the mobile phone (corresponding to the user terminal) sends a device control short message to the server.

In step S602, the server parses the received device control short message, acquires the account information, the device identifier and the device control instruction.

In step S603, the server acquires the universal infrared controller identifier corresponding to the device identifier and the infrared pulse parameters corresponding to the device control instruction.

In step S604, the server sends the universal infrared controller identifier and the infrared pulse parameters corresponding to the device control instruction to the home gateway corresponding to the account information.

In step S605, the home gateway uses the 433 MHZ band, and sends the received infrared pulse parameters to the universal infrared controller corresponding to the universal infrared controller identifier.

In step S606, the home gateway returns a response message to the server.

After sending the infrared pulse parameters to the universal infrared controller, the home gateway returns a response message to the server.

In step S607, after receiving the returned response sent by the home gateway, the server returns a short message of information successfully sending to the user's mobile phone.

In step S608, the universal infrared controller generates an infrared pulse instruction according to the infrared pulse parameters.

In step S609, the universal infrared controller uses the 38 KHZ band to send the infrared pulse instruction to the target device.

In step S610, the target device executes the received infrared pulse instruction.

Therefore, the remote control of the device is achieved by sending short messages.

Figure 7:
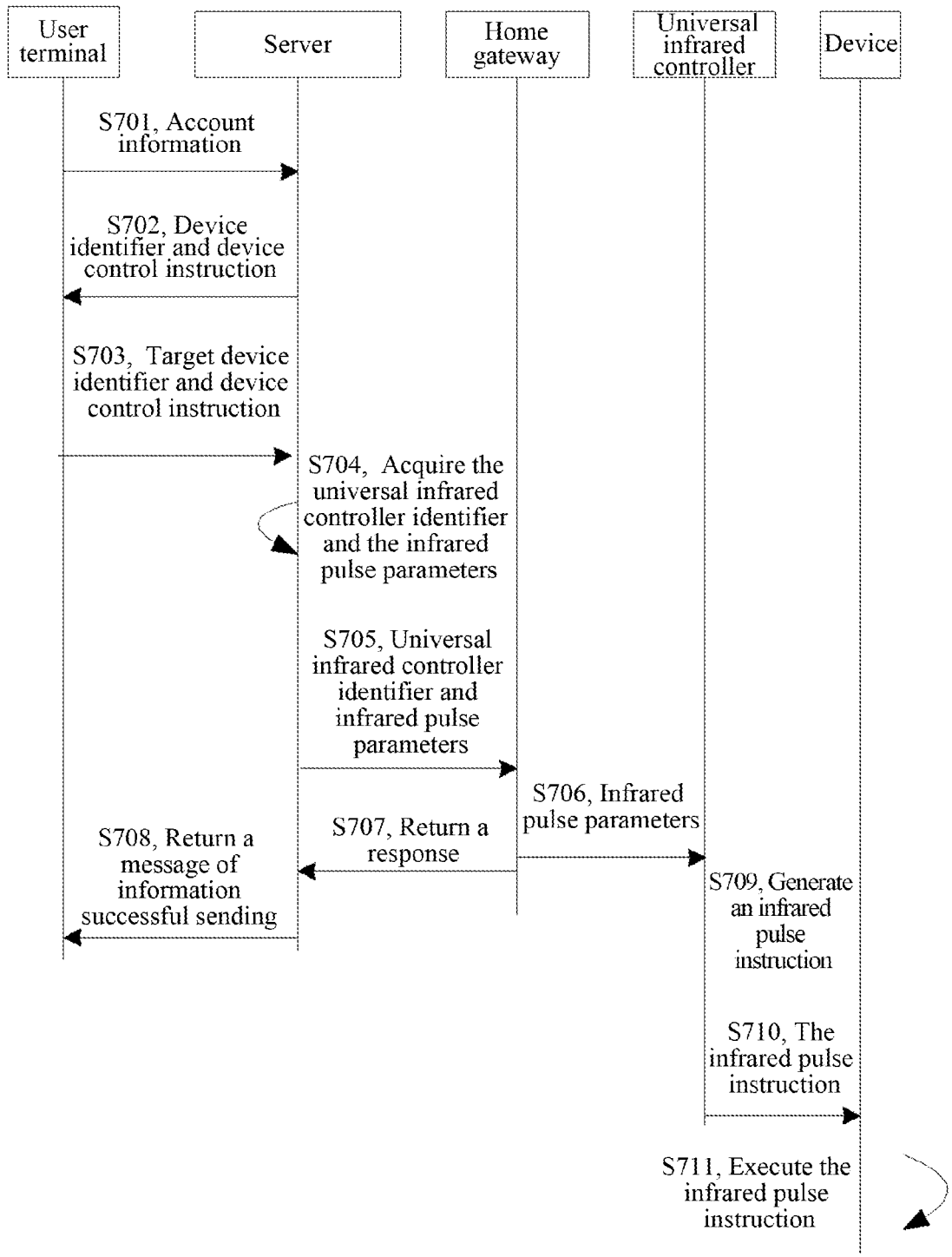
FIG. 7 is a second flow chart of implementing the remote control for the device in an embodiment of the present document.

Next, using the Web or Wireless Application Protocol (WAP) for remote control is taken as an example to illustrate the technical scheme described in the embodiment of the present document, FIG. 7 is the second flow chart of implementing the device control in the embodiment of the present document, as shown in FIG. 7, which comprises the following steps.

In step S701, the user terminal sends the account information to the server.

In step S702, the server sends the device identifier and the device control instruction corresponding to the account information to the user terminal.

In step S703, the user terminal sends the device identifier of the target device and the device control instruction that the target device needs to execute to the server.

The user terminal controls the device according to the needs of the user selection, that is, the identifier of the target device and the device control instruction that the target device needs to execute, and sends them to the server.

In step S704, the server acquires the universal infrared controller identifier corresponding to the device identifier (that is, the universal infrared controller identifier) and the infrared pulse parameters corresponding to the device control instruction.

In step S705, the server sends the universal infrared controller identifier and the infrared pulse parameters corresponding to the device control instruction to the home gateway corresponding to the account information.

In step S706, the home gateway uses the 433 MHZ band to send the received infrared pulse parameters to the universal infrared controller corresponding to the universal infrared controller identifier.

In step S707, after sending the infrared pulse parameters to the universal infrared controller, the home gateway returns a response message to the server.

In step S708, after receiving the returned response sent by the home gateway, the server returns a message of information sending successfully to the user terminal.

In step S709, the universal infrared controller generates an infrared pulse instruction according to the infrared pulse parameters.

In step S710, the universal infrared controller uses the 38 KHZ to send the infrared pulse instruction to the corresponding device.

In step S711, the target device executes the received infrared pulse instruction.

Therefore, it achieves the remote control of the device by sending short messages.

Figure 8:
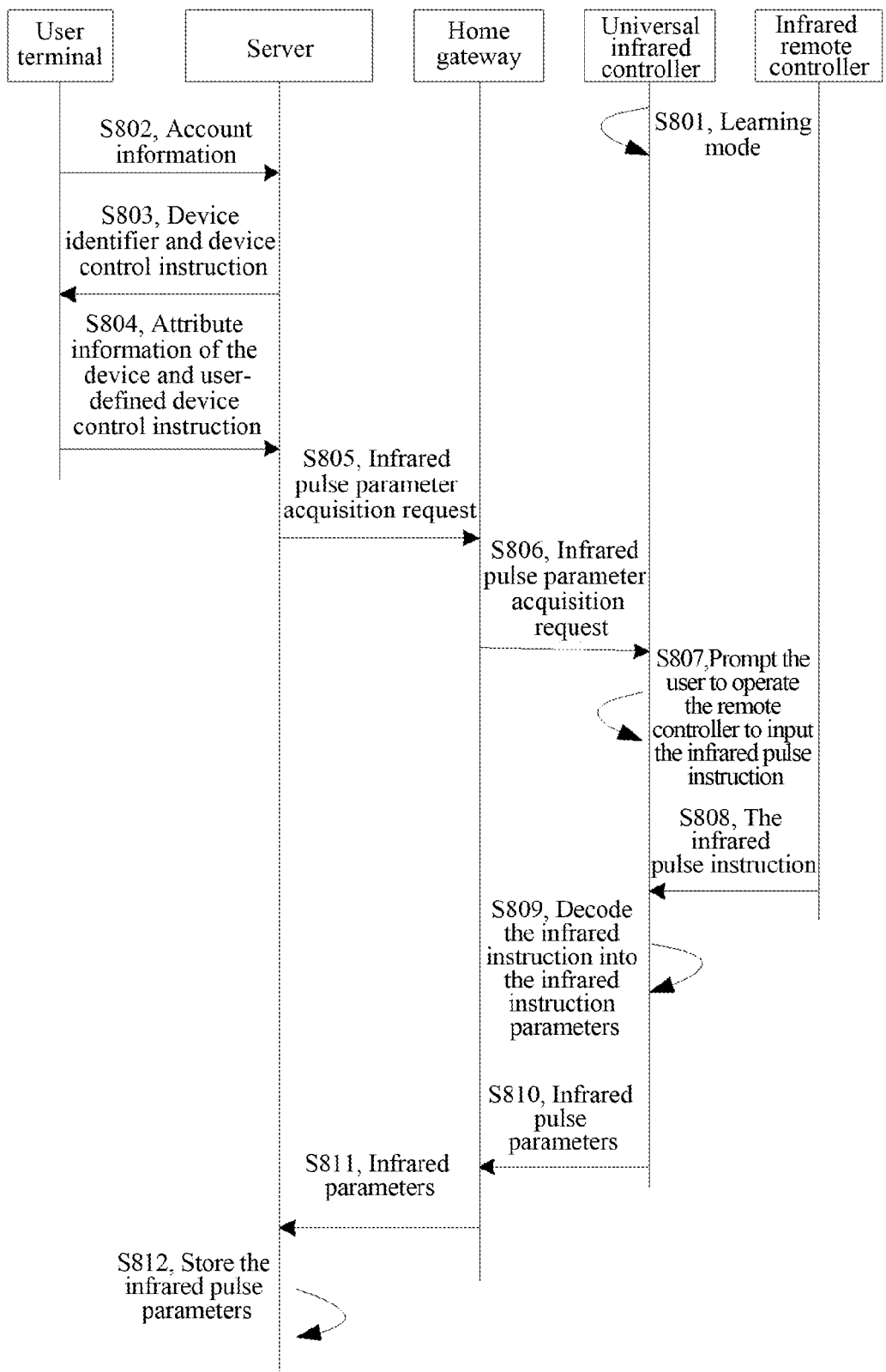
FIG. 8 is a third flow chart of implementing the remote control for the device in an embodiment of the present document.

Next, a device being configured as the target device of the remote control is taken as an example to illustrate the technical scheme described in the embodiment of the present document, and FIG. 8 is the third flow chart of implementing the device control in the embodiment of the present document, and as shown in FIG. 8, which comprises the following steps.

In step S801, the universal infrared controller enters into a learning mode.

When the universal infrared controller is in the learning mode, it may receive the infrared pulse instruction sent by the infrared remote controller and parse it into the corresponding infrared pulse parameters.

In step S802, the user terminal sends the account information to the server.

When the user needs to remotely control the device, the user sends the account information via the user terminal to acquire the device identifier and the device control instruction of the target device.

In step S803, the server sends the device identifier and the device control instruction corresponding to the account information to the user terminal.

In step S804, the user terminal sends the attribute information of the target device and the user-defined device control instruction to the server.

The target device is a device that the user desires to remotely control, when the user finds that the device identifier and the device control instruction received by the user terminal do not have a control instruction for the target device, the user triggers the user terminal to send the attribute information of the target device and the user-defined target device control instruction to the server.

In step S805, the server sends an infrared pulse parameter acquisition request to the home gateway corresponding to the account information (the account information received in step S802).

After the server receives the attribute information of the target device and the used-defined target device control instruction sent by the user terminal, it sends the infrared pulse parameter acquisition request to the home gateway corresponding to the account information.

In step S806, the home gateway sends the infrared pulse parameter acquisition request to the corresponding universal infrared controller.

In step S807, the universal infrared controller prompts the user to operate the infrared remote controller to input the infrared pulse instruction, for example, after the universal infrared controller receives the infrared pulse parameter request, it beeps and prompts the user to operate the infrared remote controller to input the infrared pulse instruction.

In step S808, the infrared remote controller sends the infrared pulse instruction to the universal infrared controller, and the infrared pulse instruction sent by the infrared remote controller corresponds to the user-defined device control instruction.

In step S809, the universal infrared controller receives the infrared pulse instruction, decodes it and generates the infrared pulse parameters.

In step S810, the universal infrared controller sends the infrared pulse parameters to the home gateway.

In step S811, the home gateway sends the infrared pulse parameters to the server.

In step S812, the server stores the infrared pulse parameters.

After the step S812, since the server has stored the universal infrared controller identifier corresponding to the device (characterized by the device identifier) and the infrared pulse parameters corresponding to the device control instruction supported by the device; after the step 812, the steps in FIG. 6 or FIG. 7 can be used to remotely control the device, which will not be repeated here.

Those skilled in the art should understand that, embodiments of the present document can be provided as methods, systems, or computer program products. Accordingly, the present document can use the forms of hardware embodiments, software embodiments, or software and hardware combined embodiments. Furthermore, the present document can use the form of computer program products implemented in one or more of computer usable storage medium containing the computer usable program code (including but not limited to disk memory and optical memory, etc).

The present document is described by referring to the flow charts and/or block diagrams of the methods, devices (systems) and computer program products in accordance with the embodiments of the present document. It should be understood that computer program instructions can be used to implement each process and/or block in the flow charts and/or block diagrams, as well as combinations of processes and/or blocks in the flow charts and/or block diagrams. The computer program instructions can be provided to a universal computer, a dedicated computer, an embedded processor or a processor of another programmable data processing device to generate a machine, to make instructions executed by the universal computer or the processor of another programmable data processing device generate a device configured to implement the functions specified in one or more processes in the flow charts or one or more blocks in the block diagrams.

These computer program instructions may also be stored in a computer readable memory that can instruct the computer or another programmable data processing device to work in a specific mode, so that the instructions stored in the computer readable memory generate products containing the instruction device, and the instruction device implements the functions specified in one or more processes in the flow charts and/or one or more blocks in the block diagrams These computer program instructions may also be loaded in the computer or another programmable data processing device so that a series of operating steps are executed in the computer or the other programmable device to generate the procedures implemented by the computer, so that the instructions executed in the computer or the other programmable device are provided as steps implementing the functions specified in one or more processes in the flow charts and/or one or more blocks in the block diagrams.

The above description is preferred embodiments of the present document, and it should be pointed out that, for those ordinarily skilled in the art, various improvements and modifications can be made without departing from the premise of the principle of the present document, and these improvements and modifications should be considered within the protection scope of the present document.

What is claimed is:

1. A device control method, comprising:
    receiving account information, a device identifier and a device control instruction sent by a user terminal;
    acquiring a universal infrared controller identifier corresponding to the device identifier and infrared pulse parameters corresponding to the device control instruction;
    sending the infrared pulse parameters to a universal infrared controller corresponding to the universal infrared controller identifier through a home gateway corresponding to the account information, wherein the infrared pulse parameters are provided for the universal infrared controller to generate an infrared pulse instruction, and the infrared pulse instruction is used to control a device corresponding to the device identifier to execute a corresponding operation.

2. The method of claim 1, wherein, said receiving account information, a device identifier and a device control instruction sent by the user terminal comprises:
    receiving device control information sent by the user terminal;
    parsing the device control information to acquire the account information, the device identifier, and the device control instruction.

3. The method of claim 1, wherein, said receiving account information, a device identifier and a device control instruction sent by a user terminal comprises:
    receiving the account information sent by the user terminal;
    sending the device identifier and the device control instruction corresponding to the account information to the user terminal for the user terminal to determine a device identifier corresponding to a target device and a device control instruction that the target device needs to execute;
    receiving the device identifier of the target device and the device control instruction sent by the user terminal.

4. The method of claim 1, wherein, before receiving the account information, the device identifier, and the device control instruction sent by the user terminal, the method further comprises:
    registering the home gateway, and storing a corresponding relationship between the account information and the home gateway;
    receiving a universal infrared controller identifier, a device identifier and attribute information of the device that are bound with the home gateway and sent by the home gateway;
    determining the device identifier and the attribute information of the device corresponding to the account information according to the corresponding relationship between the account information and the home gateway, and the device identifier and the attribute information of the device bound with the home gateway.

5. The method of claim 1, wherein, before receiving the account information, the device identifier and the device control instruction sent by the user terminal, the method further comprises:
    registering the device and storing the device control instruction of the device and infrared pulse parameters corresponding to the device control instruction according to the attribute information of the device.

6. The method of claim 5, wherein, said registering the device and storing the device control instruction of the device and the infrared pulse parameters corresponding to the device control instruction according to the attribute information of the device, comprises:
    receiving the attribute information of the device and the device control instruction sent by the user terminal;
    acquiring the infrared pulse parameters from the universal infrared controller through the home gateway, wherein the infrared pulse parameters are generated by the universal infrared controller according to a infrared pulse instruction corresponding to the device control instruction, and the infrared pulse instruction is acquired by the universal infrared controller from an infrared remote controller;

storing the attribute information of the device, the device control instruction and the infrared pulse parameters corresponding to the device control instruction.

7. The method of claim 6, wherein, before receiving the attribute information of the device and the device control instruction sent by the user terminal, the method further comprises:
   receiving a device control instruction user-defined request sent by the user terminal;
   sending the stored device control instruction to the user terminal for the user terminal to determine a user-defined device control instruction according to the device control instruction and an operation of a user.

8. The method of claim 6, wherein, the attribute information of the device comprises a type of the device, a manufacturer of the device, and a model of the device.

9. A server, comprising:
   a first receiving module, configured to receive account information, a device identifier and a device control instruction sent by a user terminal;
   a first acquiring module, configured to acquire a universal infrared controller identifier corresponding to the device identifier and infrared pulse parameters corresponding to the device control instruction;
   a first sending module, configured to send the infrared pulse parameters to a universal infrared controller corresponding to the universal infrared controller identifier through a home gateway corresponding to the account information, wherein the infrared pulse parameters are provided for the universal infrared controller to generate an infrared pulse instruction, and the infrared pulse instruction is used to control a device corresponding to the device identifier to execute a corresponding operation.

10. The server of claim 9, wherein, the first receiving module comprises:
    a first receiving unit, configured to receive device control information sent by the user terminal;
    a first parsing unit, configured to parse the device control information to acquire the account information, the device identifier, and the device control instruction.

11. The server of claim 9, wherein, the first receiving module comprises:
    a second receiving unit, configured to receive account information sent by the user terminal;
    a first sending unit, configured to send the device identifier and the device control instruction corresponding to the account information to the user terminal for the user terminal to determine a device identifier corresponding to a target device and a device control instruction that the target device needs to execute;
    a third receiving unit, configured to receive the device identifier of the target device and the device control instruction sent by the user terminal.

12. The server of claim 9, wherein, the server further comprises:
    a first registering module, configured to register the home gateway and store a corresponding relationship between the account information and the home gateway;
    a second receiving module, configured to receive a universal infrared controller identifier, a device identifier and attribute information of the device that are bound with the home gateway and sent by the home gateway.

13. The server of claim 9, wherein, the server further comprises:

a second registering module, configured to register the device and store the device control instruction of the device and infrared pulse parameters corresponding to the device control instruction according to the attribute information of the device.

14. The server of claim 13, wherein, the second registering module comprises:
    a fourth receiving unit, configured to receive the attribute information of the device and the device control instruction sent by the user terminal;
    a fifth receiving unit, configured to acquire the infrared pulse parameters from the universal infrared controller through the home gateway, wherein the infrared pulse parameters acquired by the fifth receiving unit are generated by the universal infrared controller according to the infrared pulse instruction corresponding to the device control instruction;
    a storing unit, configured to store the attribute information of the device, the device control instruction and the infrared pulse parameters corresponding to the device control instruction.

15. The server of claim 13, wherein, the second registering module further comprises:
    a sixth receiving unit, configured to receive a device control instruction user-defined request sent by the user terminal;
    a second sending unit, configured to send the stored device control instruction to the user terminal for the user terminal to determine a user-defined device control instruction according to the device control instruction and an operation of a user.

16. A device control system, comprising: a server, a home gateway and a universal infrared controller; wherein,
    the server is configured to receive account information, a device identifier and a device control instruction sent by a user terminal; acquire a universal infrared controller identifier corresponding to the device identifier and infrared pulse parameters corresponding to the device control instruction; send the infrared pulse parameters to a universal infrared controller corresponding to the universal infrared controller identifier through the home gateway corresponding to the account information;
    the home gateway is configured to receive the universal infrared controller identifier and the infrared pulse parameters sent by the server, and send the infrared pulse parameters to the universal infrared controller corresponding to the universal infrared controller identifier;
    the universal infrared controller is configured to generate an infrared pulse instruction according to the infrared pulse parameters sent by the home gateway, and send the generated infrared pulse instruction to a device corresponding to the device identifier to make the device execute an operation.

17. The system of claim 16, wherein,
    the home gateway is further configured to bind the universal infrared controller identifier, the device identifier, and the attribute information of the device; send the universal infrared controller identifier, the device identifier and the attribute information of the device that are bound with the home gateway to the server.

18. The system of claim 16, wherein,
    the home gateway is further configured to send the infrared pulse parameters acquired from the universal infrared controller to the server.

19. The system of claim 16, wherein, the system further comprises:
- an infrared remote controller, configured to send an infrared pulse instruction corresponding to the device control instruction to the universal infrared controller;
- the universal infrared controller is further configured to generate the infrared pulse parameters according to the received infrared pulse instruction and send the infrared pulse parameters to the home gateway.

20. A computer storage medium, wherein the computer storage medium stores computer-executable instructions, and the computer-executable instructions are used for executing the device control method of claim 1.

* * * * *